(12) United States Patent
Matkovich

(10) Patent No.: US 6,199,682 B1
(45) Date of Patent: *Mar. 13, 2001

(54) CONVEYOR LOADING APPARATUS

(75) Inventor: Mario Matkovich, Williamstown (AU)

(73) Assignee: Rosebay Terrace Pty Ltd., Victoria (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,803

(22) PCT Filed: Nov. 15, 1996

(86) PCT No.: PCT/AU96/00722

§ 371 Date: May 15, 1998

§ 102(e) Date: May 15, 1998

(87) PCT Pub. No.: WO97/18151

PCT Pub. Date: May 22, 1997

(30) Foreign Application Priority Data

Nov. 15, 1995 (AU) .................................................. 6579
Feb. 21, 1996 (AU) .................................................. 8168

(51) Int. Cl.[7] .................................................. B65G 37/00
(52) U.S. Cl. .................................. 198/465.4; 198/486.1; 198/680
(58) Field of Search .............................. 198/465.4, 486.1, 198/678.1, 680

(56) References Cited

U.S. PATENT DOCUMENTS

| 2,661,103 | 12/1953 | Fay et al. | 214/6 |
|---|---|---|---|
| 2,890,556 | 6/1959 | Engleson et al. | 53/251 |
| 3,101,868 | 8/1963 | Glaubke | 221/225 |
| 3,160,316 | 12/1964 | Kerr | 221/225 |
| 3,207,286 | 9/1965 | Cozzoli | 198/25 |
| 4,022,338 | 5/1977 | Laursen | 214/89 |
| 5,667,056 | * 9/1997 | Kimmet | 198/465.4 |
| 5,806,657 | * 9/1998 | Enderlein et al. | 198/465.4 |
| 5,878,867 | * 3/1999 | Schneuing | 198/486.1 |

FOREIGN PATENT DOCUMENTS

| 3912443 A1 | 10/1990 | (DE) . |
|---|---|---|
| 854332 | 11/1960 | (GB) . |

OTHER PUBLICATIONS

Derwent Abstract Accession No. 92–086869/11, SU 1641745 A (Lengd Vympel PRD AS) Apr. 15, 1991.

Derwent Abstract Accession No. 88–055271/08, SU 1323486 A (Assembly Mechanism) Jul. 15, 1987.

* cited by examiner

Primary Examiner—Joseph E. Valenza
(74) Attorney, Agent, or Firm—Wolf, Greenfield & Sacks, P.C.

(57) ABSTRACT

An apparatus (1) for loading articles (2) onto a moving conveyor, the apparatus including (a) transport means (3a, 3b, 3c) on the conveyor which includes holding means (5) adapted to engage at least a portion of an article (2) so as to hold the article (2) in connected relation with the conveyor, and (b) locating means (6) operable to cause an article (2) positioned thereon to move into a position in which it cant thereafter be engaged by the holding means (5); wherein the transport means (3a, 3b, 3c) and the locating means (6) are co-operable such that the article (2) can be caused to be moved on the locating means (6) with the transport means (3a, 3b, 3c to being engaged by the holding means (5).

29 Claims, 4 Drawing Sheets

CONVEYOR LOADING APPARATUS

BACKGROUND OF THE INVENTION

The present invention relates to an apparatus for loading articles onto a conveyor. The invention has particular application for use in the automatic sorting or processing of articles using a vision recognition system and the invention is herein described in that context. However, it is to be appreciated that the invention has broader application and is not limited to this particular use.

It is known to use mechanical conveying means in conjunction with an automated vision recognition system for the purpose of processing articles. For example, such systems are used for quality assurance. The automatic vision system usually operates by taking an image of an article and comparing the image against information stored on the memory, thus allowing the system to identify the article and to ensure that it conforms with a pre-recorded standard.

Another example where such systems may be used is described in the applicant's co-pending Australian patent application PN6579 for the sorting of articles into batches such that the batched articles are the same or have some unifying characteristic. Such a system can be advantageously used in the sorting of articles for recycling. In such a system, the image of the article is compared against information stored in the memory so as to be characterised into one of a particular group. The article is then moved under operation of the conveyor to be deposited in a collection area associated with that group.

Where vision recognition systems are used, it is generally necessary for the article to be carefully aligned for the purposes of comparing the image of the article with a pre-recorded standard. This is particularly so if there are relatively small differences between the respective articles being sorted. When articles are processed on a conveyor system it is often difficult to deposit the articles onto the conveyor in a predetermined orientation in a manner such that they will be accurately aligned for the purposes of visual recognition. It is of course possible to provide shaped holders for each conveyed article but this is expensive, and often not practical when there are a large number of articles to be sorted or the articles are to be sorted into a relatively large number of groups. In many cases, it is difficult to accurately align the article on the conveyor without stopping the conveyor and manipulating the article at an alignment station from which it can thereafter be conveyed to a vision recognition system. This practice has the disadvantage of being labour intensive and therefore costly. Furthermore, it is desirable that the automated mechanism move continuously if it is to maximize the processing rate. In addition, in any system where the conveying mechanism is required to stop and start, there is a greater likelihood of malfunction due to jamming or the like.

SUMMARY OF THE INVENTION

An aim of the present invention is to provide an apparatus for loading articles onto a conveyor in a manner that facilitates the deposit onto the conveyor of the articles in substantially the desired alignment. A further aim of the invention is to provide a loading apparatus which enables loading of the articles under continuous movement of the conveyor.

Accordingly in its broadest terms, the present invention provides an apparatus for loading articles onto a moving conveyor including:

(a) transport means mounted on the conveyor which includes holding means adapted to engage at least a portion of an article so as to hold the article in connected relation with the conveyor; and (b) locating means operable to cause an article positioned thereon to move into a position in which it can thereafter be engaged by the holding means wherein the transport means and the locating means are co-operable such that the article is caused to be moved on the locating means with the transport means prior to being engaged by the holding means.

In a second embodiment of the invention there is provided an apparatus including:

(a) a conveyor adapted to move an article from one location to another location;

(b) transport means mounted on the conveyor which includes holding means adapted to engage at least a portion of the said article so as to hold the article in connected relation with the conveyor; and (c) locating means operable to cause an article once positioned thereon to move into a position in which it can thereafter be engaged by the holding means wherein the transport means and the locating means are co-operable such that the article is caused to be moved on the locating means with the transport means prior to being engaged by the holding means.

The advantage of the present invention is that the article and the transport means are adapted to move together before the article is engaged with the holding means. The benefit of this arrangement is that the relative speed between the article and the transport means is reduced, thereby enabling more accurate engagement of the article with the holding means. In particular, the reduction in this relative speed reduces impacting forces between the article and the holding means during engagement of the article by the holding means. A further benefit of this arrangement is that it enables the article to align or settle correctly before engaging with the holding means. Further, the reduction in the relative speed can be achieved without requiring the conveyor to stop or even slow down.

The apparatus is particularly suited for use in the collection and conveyance of articles such as garment hangers although it will be appreciated to those skilled in the art that the invention is by no means limited to its use in connection with such articles.

Preferably, the holding means is in the form of a recess on the transport means which is configured to accommodate at least a portion of the article. In a preferred form, where the apparatus is used for collecting and conveying garment hangers, the recess is configured to accommodate a small part of the hanger. In one form, the recess provides a flat seat on which the hooked part of the garment hanger is adapted to be located. In this arrangement, the seat supports the hanger with the remaining part of the hanger being arranged to suspend from the transport means.

The transport means is mounted on the conveyor. It is intended that the transport means be shaped and designed so that it is able to carry articles being conveyed from one location to another on the conveyor.

Preferably, the transport means includes an abutment surface which is adapted to abut against a portion of the article once positioned appropriately by the locating means. The abutment surface is adapted to project forwardly from the holding means, in the direction of the conveyor movement, so that on abutment with the abutment surface, the article is adapted to be moved with the transport means under operation of the conveyor prior to being engaged by the holding means.

Preferably, the locating means includes a ramp which is inclined relative to the direction of movement of the transport means. In this arrangement the locating means is adapted to move the article onto the ramp from where it may be moved with or by the transport means under operation of the conveyor. The article may be moved by separate conveying means located on or adjacent to the ramp so that the article is caused to move in concert with the transport means. Alternatively, and preferably the article is caused to move along the ramp by the transport means. In such an arrangement, it is also preferred that the apparatus include one or more retaining mechanisms which are fitted so to limit the forward movement of the article when it is first contacted by the moving transport means. As the article moves along the ramp it is preferred that it simultaneously be caused to move relative to the abutment surface and the apparatus is arranged such that this relative movement continues until the article is moved from the abutment surface and into engagement with the holding means.

Preferably, the apparatus further includes retaining means operable to retain the article to the holding means. In one form, the retaining means is adapted to adopt either an operative mode wherein it is operable to retain the article to the holding means or an inoperative mode wherein it does not influence the position of the article relative to the holding means.

In a preferred form, the retaining means is operable to temporarily change from the operative mode to the inoperative mode whilst the article is in engagement with the holding means. This arrangement enables the article to be adjusted if necessary whilst it is in engagement with the holding means. In one form, when the retaining means is in the inoperative mode, the article may be checked by external means to ensure that it is correctly aligned. In another form, the article is merely allowed to settle under gravity whilst the retaining means is in the inoperative mode. This latter form can be used when the article is a garment hanger and the garment hanger is supported at its hooked region as this region is a balance point for the garment hanger so that the hanger will have a tendency to align under its own accord under the influence of gravity.

Preferably the retaining means is also adapted to adopt a discharge mode wherein it is operable to remove the article from the holding means. In this way, the retaining means is able to discharge the article from the conveyor.

In a preferred form, the retaining means includes a pair of fingers which are adapted to be located on opposite sides of the article. The fingers are controllable by an operation arm which is able to move the fingers so to change the retaining means between the operative, inoperative and discharge modes.

In one form, the fingers are located at one of opposite ends of the operation arm. A pivot is located intermediate of the arm ends and the mode of the fingers is controlled by movement of the arm about the pivot. In this way, the retaining means is able to change between the operative, inoperative and discharge modes by applying a force to the end of the operation arm opposite to the fingers. In a preferred form the force can be applied automatically through the use of a cam or the like.

Preferably, the apparatus further includes positioning means adapted to locate the article at a leading end of the ramp. Preferably the articles are initially stored remote from the leading end of the ramp and the positioning means includes an indexing mechanism which is arranged to move individual ones of the articles at predetermined intervals onto the leading end of the ramp. The indexing mechanism is coordinated with the conveyor so that a single article is associated with each transport means.

In addition, the locating means of the apparatus preferably includes means for conveying the article located thereon to the indexing mechanism. Such means can be in the form of a moving belt, chain or screw.

The loading apparatus of the invention is particularly suited to be incorporated in an apparatus for automatically sorting garment hangers for recycling. A description of a preferred form of the apparatus of the present invention is hereafter provided as is a description of a sorting apparatus incorporating a loading apparatus according to an embodiment of the invention, both with reference to the accompanying drawings. The particularity of these drawings and the related description is not to be understood as superseding the generality of the preceding description of the invention.

DETAILED DESCRIPTION

Figure 1:
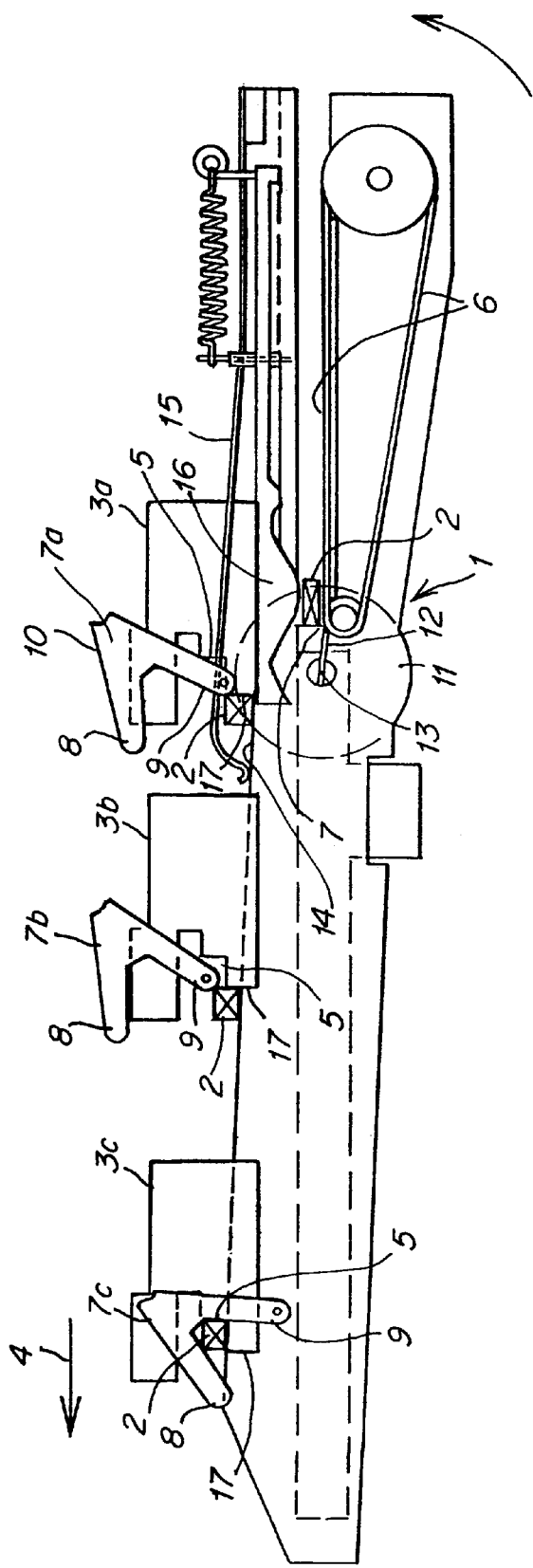
FIG. 1 is a side view of an automatic loader for loading garment hangers onto a moving conveyor made in accordance with one embodiment of the invention.

With reference to FIG. 1, there is illustrated a loading apparatus which is generally designated by the numeral 1 for loading garment hangers 2 onto a moving conveyor (not shown) which operates to move the respective transport means 3a, 3b and 3c in the direction of the arrow 4. Each of transport means 3a, 3b and 3c are mounted on a conveyor adapted to move the said transport means at a predetermined speed past the loading apparatus 1. Each of the respective transport means includes holding means 5 being in the form of a recess onto which a portion of the garment hanger 2 is adapted to be seated. In FIG. 1, all that is visible of the hanger is the cross sectional surface of part of the hook and it will be seen that recess 5 is shaped to neatly accommodate the hook of the hanger once it has been loaded onto the transport means such as can be seen for the transport means identified as 3c. The locating means of the embodiment shown in FIG. 1 includes a rotating belt 6 on which garment hangers may be positioned. The manner by which garment hangers are conveyed to rotating belt 6 does not form part of the present invention. However, it will be appreciated that a number of methods known in the art are available for delivering articles such as hangers to this position. For example, a rod having a screw thread or rib continuously extending in a helical fashion may be used so that when the rod is rotated in a direction such that the screw thread or rib rotates upwardly, hangers located on the rod whilst it is circulating will move upwardly along the rod. Alternatively, articles may be manually located onto the rotating belt 6. Preferably, the belt 6 provides adequate friction between the garment hanger 2 and the belt 6 for the garment hanger to be moved in the direction of the belt rotation (shown by the arrow) once it is deposited there.

In one preferment, an optical sensor is located adjacent to the belt 6 and is activated when more than a predetermined number of hangers are located upon it. When the predetermined number of hangers are seated on belt 6, the optical sensor can operate to stop any other automated mechanism which is being used to deliver the hangers to the conveying belt. This prevents overstocking of garment hangers onto the rotating belt 6. Preferably, the belt 6 continuously rotates so that hangers 2 positioned thereon will firmly abut against end portion 7. The transport means 3a, 3b and 3c are conveyed by the conveyor past loader 1. Attached to each of the transport means 3a, 3b and 3c are respective retaining means 7a, 7b and 7c. Said retaining means in each case includes fingers 8 and 9 which are part of operational arms 10 which are shown in full detail in FIG. 4. Indexing mechanism 11 includes a lifting finger 12. As garment hangers 2 reach end portion 7, the indexing mechanism 11 awaits the arrival of one of the transporting means and then rotates about axis 13 such that lifting finger 12 engages under the hook of hanger 2 and lifts it on to the leading end of ramp 14 in front of transport means 3a. Ramp 14 is an inclined surface. A retaining leaf spring 15 prevents the garment hanger 2 from being thrown too far forward by the lifting finger 12 and retaining arm 16 prevents the hanger from being thrown too high into the air. Once garment hanger 2 has been lifted on to the leading end of ramp 14, the passing transport means 3a comes into contact with the hanger 2 and moves it forward. It will be appreciated from FIG. 1 that as the transport means 3a moves forward, it pushes garment hanger 2 along the ramp and up the incline. Each transport means includes an abutment surface 17. In the position of transport means 3a, the abutment surface 17 abuts against and pushes the garment hanger 2 forward. The relative movement of the garment hanger as the transport means moves in the direction of arrow 4 can be seen from each of the representations of the respective garment hangers and transport means 3a, 3b and 3c. By the time the transport means has moved into the position of that of transport means 3c, the garment hanger has been sufficiently elevated by the ramp to be seated in the holding means 5. Simultaneously, due to the action of a cam (located above operational arm 10), the operational arm 10 pivots through the positions illustrated at the locations of each of transport means 3a, 3b and 3c so that by the time it reaches that of transport means 3c, fingers 8 and 9 firmly retain the garment hanger 2 to the holding means.

Once loaded onto the transport means, a chain conveyor conveys the garment hanger to a further desired location.

Figure 2:
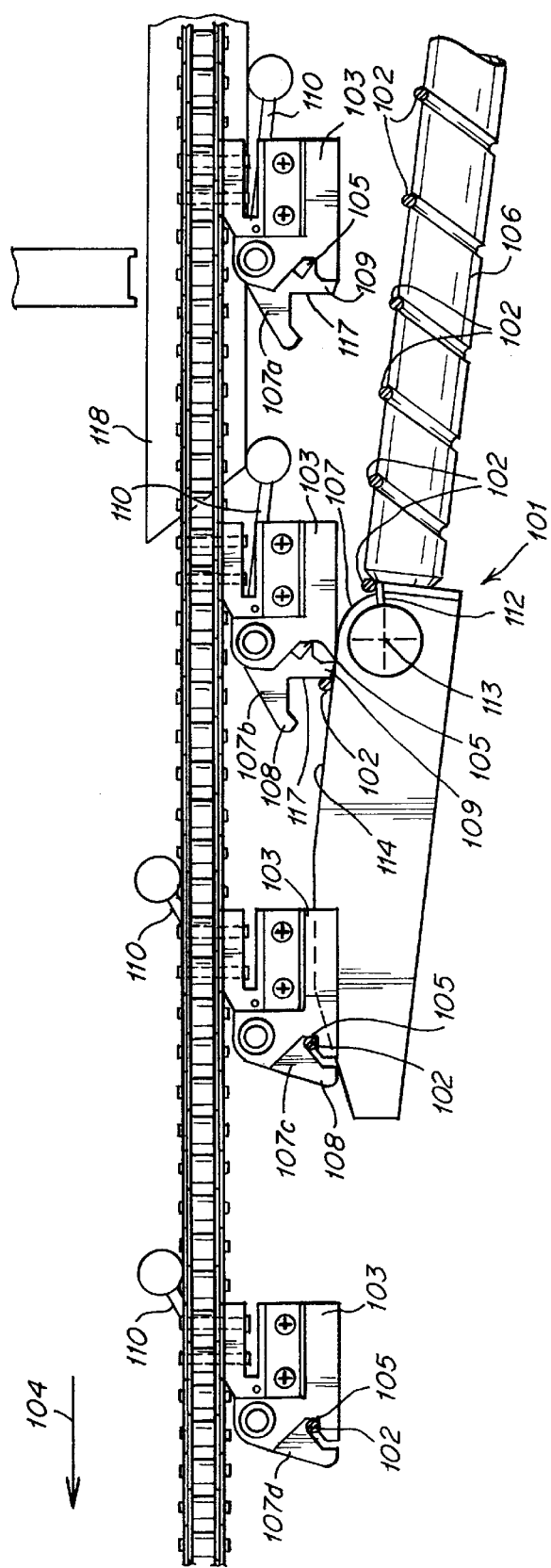
FIG. 2 is a side view of an automatic loader for loading garment hangers onto a moving conveyor in accordance with a further embodiment of the invention.

With reference to FIG. 2, an alternative embodiment of the loading apparatus is illustrated. This loading apparatus generally designated by the numeral 101 is in many respects similar to the apparatus illustrated in FIG. 1. Corresponding components have been numbered using the same numbers used to identify features in FIG. 1 with the addition of 100. In the embodiment shown in FIG. 2, garment hangers 102 are conveyed to end portion 107 by a rotating screw 106 which is used in place of the conveyor belt 6 shown in the embodiment in FIG. 1. This embodiment of the invention includes transport means of modified design in which the abutment surface 117 used to move hangers 102 along ramp 114 is part of the surface of finger 109 in each of retaining means 107a–d fitted to any forming part of the respective transport means. Operational arm 110 is spring loaded and is held down whilst the end of the arm is in contact with cam 118. This keeps the retaining means in the discharge mode (e.g. 107a and 107b). After moving past cam 118, the operational arm can move upwardly thus causing the respective retaining means to move into an operative mode where the hangers 102 are firmly retained on holding recess 105 (e.g. 107c and *d*).

Figure 3:
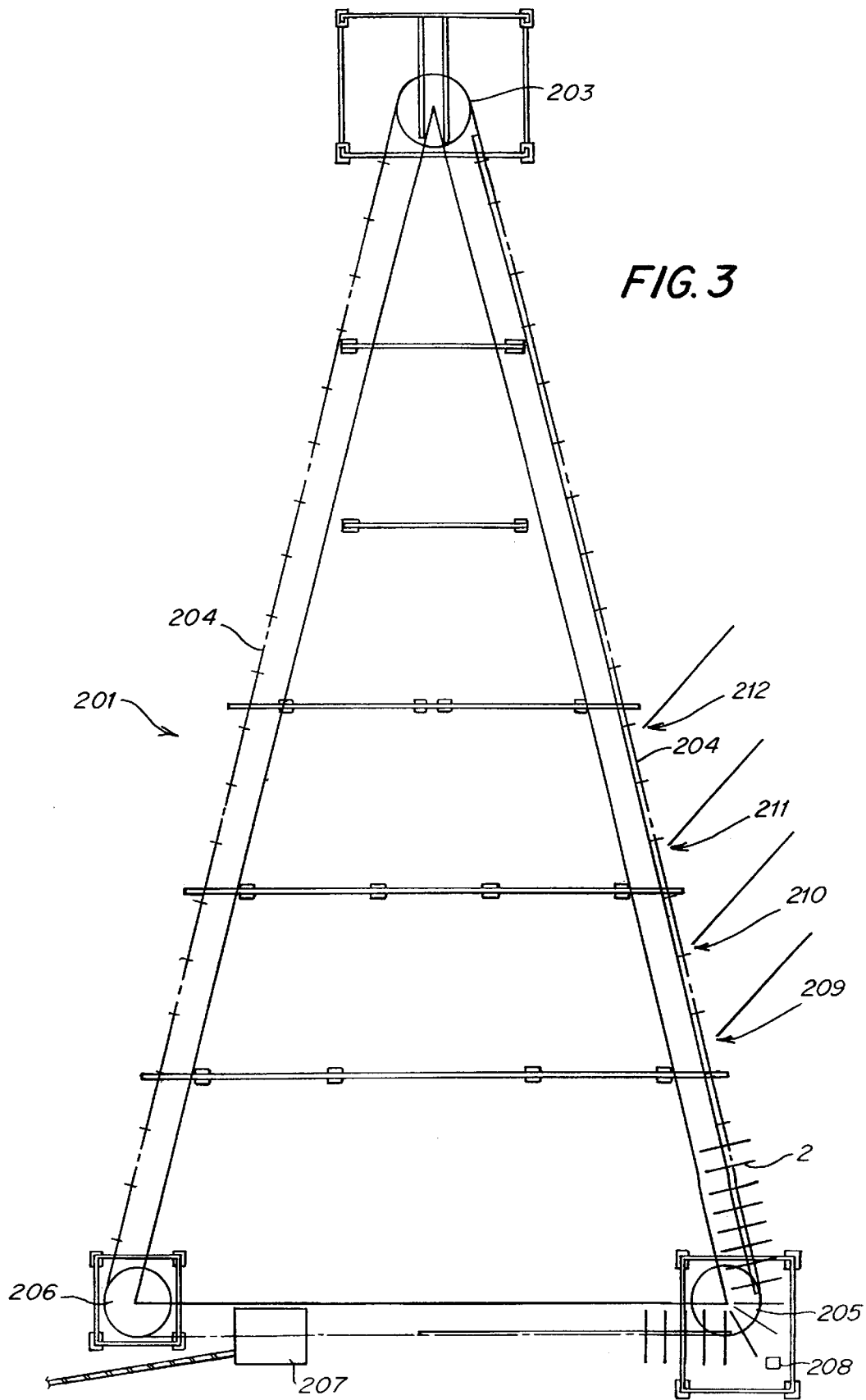
FIG. 3 is a plan view of a sorting apparatus in which the conveying means travels in a loop around three separate turntables.

Referring to FIG. 3, there is shown an apparatus generally designated by the numeral 201 for the sorting of garment hangers. In the embodiment shown, a container of unsorted hangers including four different types (types A, B, C and D) are sorted by the apparatus into batches wherein each batch the hangers are of the same type. Garment hangers 2 are shown in overhead outline adjacent turntable 205. Garment hangers 2 are transported around a predetermined path 204 by conveying means being a chain conveyor and transport means and this is best seen by reference to FIGS. 1, 2 and 4. The sorting apparatus also includes turntables 203 and 206. Turntable 205 includes processing means.

The garment hangers are loaded onto the chain conveyor at location 207 by an automatic loading apparatus of a type the subject of the present invention. Either of the embodiments shown in either FIGS. 1 or 2 would be suitable for this purpose. Once the garment hanger 2 is loaded onto the transport means, the garment hangers are sequentially conveyed to turntable 205. At turntable 205, each individual garment hanger 2 is identified by an adjacent vision recognition unit 208. Alternatively, vision recognition unit 208 may be located adjacent the chain conveyor at other suitable or convenient locations. Removal means located at positions 209, 210, 211 and 212 are adapted to remove the hangers 2 from the chain conveyor. Each garment hanger is retained on an individual transport means as shown in FIGS. 1 and 2. As each of the respective hangers pass by vision recognition unit 208, an image of the respective hangers is recorded and compared against information stored on a memory with processing means associated with the vision recognition unit 208 allowing the identification of the garment hanger as being either of type A, B, C or D. The vision recognition unit 208 has processing means so to match information concerning the type of hanger which has passed it with the specific transport means on which the hanger is retained. The system is coordinated such that the appropriate removal means designated for the particular hanger type, either 209, 210, 211 or 212 will be activated as the transport means holding the identified hanger is conveyed to any one of these respective locations.

The transport means, once having had the garment hanger removed from it, proceeds back to loading station 207 so to be loaded with a new hanger. Thus, the process is a continuous one around a closed loop.

Figure 4:
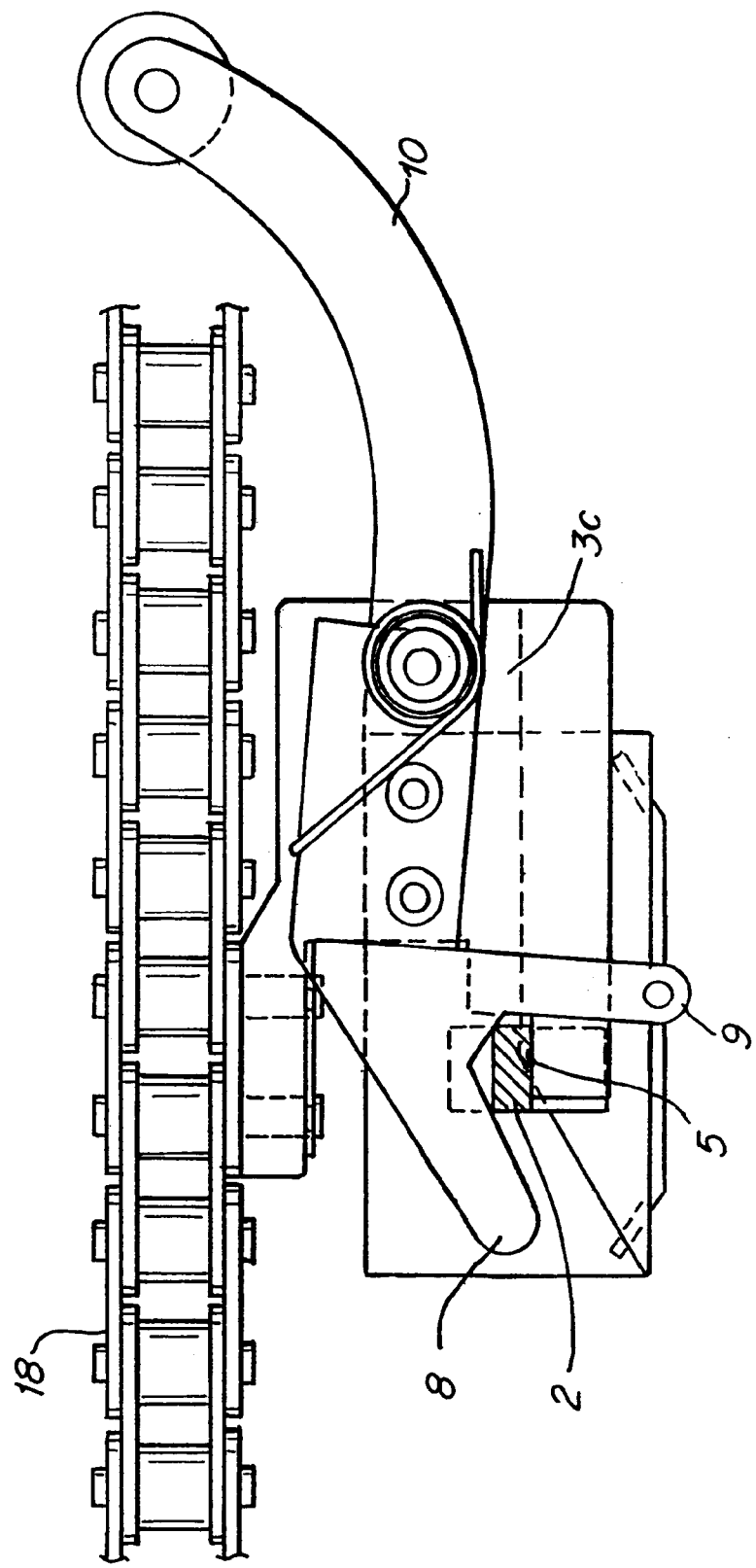
FIG. 4 is a cross sectional view of the transport means used in the embodiment shown in FIG. 1 with a garment hanger engaged within the said holding means.

With reference to FIG. 4 there is illustrated a cross sectional view of transport means 3c with a garment hanger 2 retained thereon. In the position shown in FIG. 4, the retaining means is in an operative mode retaining the garment hanger 2 firmly on holding means 5 thus retaining the garment hanger 2 to the transport means. It will be appreciated that if operative arm 10 is caused to move downwardly in the direction of the arrow shown in FIG. 4, that finger 8 will remove pressure from garment hanger 2, thus temporarily changing the mode to an inoperative one where the garment hanger 2 may be allowed to settle under the influence of gravity for alignment. If control arm 10 is forced to move further in the direction of the arrow, the retaining means will adopt a discharge mode as finger 9 will cause the garment hanger 2 to be ejected off the holding means. Thus, the design of the retaining means as illustrated in FIG. 4 enables flexible control of the garment hanger whilst being conveyed on the transport means so that it may be optionally, firmly retained, loosely retained where it can be further aligned or discharged.

Thus a convenient automated system for loading articles onto a moving conveyor is provided. It has particular application for use with respect to garment hangers and the sorting and batching of such articles. The apparatus disclosed simply requires one manual operator to load garment hangers onto the system. Thereafter, the hangers may be processed and delivered onto a moving conveyor where they may be further processed or transported as desired.

It will be appreciated that various modifications and/or improvements can be made to the apparatus hereinbefore described without departing from the spirit or ambit of the invention as claimed in the following claims.

What is claimed is:

1. An apparatus for loading articles onto a moving conveyor, the apparatus including:
   (a) transport means mounted on the conveyor which includes holding means adapted to engage at least a portion of an article so as to hold the article in connected relation with the conveyor;
   (b) locating means operable to cause an article positioned thereon to move into a position in which it can thereafter be engaged by the holding means; and
   (c) retaining means operable to retain the article to the holding means, wherein the retaining means biases the article towards the holding means;
   wherein the transport means and the locating means are co-operable such that the article can be caused to be moved on the locating means by the transport means prior to being engaged by holding means.

2. An apparatus for collecting and conveying an article, the apparatus including:
   (a) a conveyor adapted to move an article from one location to another location;
   (b) transport means mounted on the conveyor which includes holding means adapted to engage at least a portion of the said article so as to hold the article in connected relation with the conveyor;
   (c) locating means operable to cause an article once positioned thereon to move into a position in which it can thereafter be engaged by the holding means; and
   (d) retaining means operable to retain the article to the holding means, wherein the retaining means biases the article towards the holding means;
   wherein the transport means and the locating means are co-operable such that the article is caused to be moved on the locating means by the transport means prior to being engaged by the holding means.

3. An apparatus as claimed in either one of claims 1 or 2 wherein said locating means includes a ramp which is inclined relative to the direction of movement of the transport means.

4. An apparatus as claimed in claim 3 wherein the transport means is adapted to move the article up the inclined ramp under operation of the conveyor.

5. An apparatus as claimed in claim 3 wherein said transport means includes an abutment surface which is adapted to abut against a portion of the article once positioned on the ramp of the locating means.

6. An apparatus as claimed in claim 5 wherein movement of the article along the ramp is caused by the application of a force against the article by the abutment surface of the transport means.

7. An apparatus as claimed in any one of claims 1 or 2 wherein movement of the article along the ramp causes relative movement of the article with the abutment surface so that the article moves towards the holding means.

8. An apparatus as claimed in any one of claims 1 or 2 in which the holding means includes a recess which is configured to accommodate at least a portion of the article.

9. An apparatus as claimed in any one of claims 1 or 2 wherein the apparatus is adapted to load garment hangers onto the moving conveyor and said holding means includes a recess configured to accommodate a portion of the said garment hanger.

10. An apparatus as claimed in claim 9 wherein said holding means includes a recess configured to accommodate part of the hook of the garment hanger.

11. An apparatus as claimed in claim 1 in which said retaining means is connected to and forms part of the transport means.

12. An apparatus as claimed in claim 1 wherein said retaining means is adapted to adopt either an operative mode in which it is operable to retain the article to the holding means or an inoperative mode in which it does not influence the position of the article relative to the holding means.

13. An apparatus as claimed in claim 12 wherein said retaining means is adapted to move from an operative mode to an inoperative mode whilst the article is engaged with the holding means.

14. An apparatus as claimed in claim 1 wherein said retaining means is adapted to adopt a discharge mode in which it operates to remove the article from the holding means.

15. An apparatus as claimed in claim 1 wherein said retaining means includes a pair of fingers which are adapted to be located on opposite sides of the article.

16. An apparatus as claimed in claim 1 wherein said retaining means includes a single finger operable through the center of the holding means.

17. An apparatus as claimed in claim 15 wherein said fingers are controllable by an operation arm attached thereto which is able to move the fingers so as to change the retaining means between operative, inoperative and discharge modes.

18. An apparatus as claimed in any one of claims 1 or 2 wherein said apparatus further includes positioning means adapted to move the article to the leading end of the ramp.

19. An apparatus as claimed in claim 18 wherein said positioning means includes an indexing mechanism which is arranged to move individual ones of the articles at predetermined intervals onto the leading end of the ramp.

20. An apparatus as claimed in claim 19 wherein said indexing mechanism is coordinated with the conveyor so that the article is associated with the transport means.

21. An apparatus as claimed in any one of 1 or 2 claims wherein said article is a garment hanger.

22. An apparatus for loading articles onto a moving conveyor, the apparatus including:
   (a) transport means mounted on the conveyor which includes holding means adapted to engage at least a portion of an article so as to hold the article in connected relation with the conveyor;
   (b) locating means operable to cause an article positioned thereon to move into a position in which it can thereafter be engaged by the holding means, wherein the transport means and the locating means are co-operable such that the article can be caused to be moved on the locating means with the transport means prior to being engaged by the holding means; and
   (c) retaining means operable to retain the article to the holding means, wherein the retaining means is adapted to adopt a discharge mode in which it operates to remove the article from the holding means.

23. An apparatus for collecting and conveying an article, the apparatus including:
   (a) a conveyor adapted to move the article from one location to another location;
   (b) transport means mounted on the conveyor which includes holding means adapted to engage at least a portion of the said article so as to hold the article in connected relation with the conveyor;

(c) locating means operable to cause the article once positioned thereon to move into position in which it can thereafter be engaged by the holding means, wherein the transport means and the locating means are co-operable such that the article is caused to be moved on the locating means with the transport means prior to being engaged by the holding means; and (d) retaining means operable to retain the article to the holding means, wherein said retaining means is adapted to adopt a discharge mode in which it operates to remove the article from the holding means.

24. An apparatus for loading articles onto a moving conveyor, the apparatus including:

(a) transport means mounted on the conveyor which includes holding means adapted to engage at least a portion of an article so as to hold the article in connected relation with the conveyor;

(b) locating means operable to cause the article positioned thereon to move into a position in which it can thereafter be engaged by the holding means, wherein the transport means and the locating means are co-operable such that the article can be caused to be moved on the locating means with the transport means prior to being engaged by the holding means; and (c) retaining means operable to retain the article to the holding means, wherein the retaining means includes a pair of fingers which are adapted to be located on opposite sides of the article.

25. An apparatus for collecting and conveying an article, the apparatus including:

(a) a conveyor adapted to move the article from one location to another location;

(b) transport means mounted on the conveyor which includes holding means adapted to engage at least a portion of the said article so as to hold the article in connected relation with the conveyor;

(c) locating means operable to cause the article once positioned thereon to move into a position in which it can thereafter be engaged by the holding means, wherein the transport means and the locating means are co-operable such that the article is caused to be moved on the locating means with the transport means prior to being engaged by the holding means; and (d) retaining means operable to retain the article to the holding means, wherein the retaining means includes a pair of fingers which are adapted to be located on opposite sides of the article.

26. An apparatus as claimed in claim 24 wherein said fingers are controllable by an operation arm attached thereto which is able to move the fingers so as to change the retaining means between operative, inoperative, and discharge modes.

27. An apparatus as claimed in claim 2 in which said retaining means is connected to and forms part of the transport means.

28. The apparatus as claimed in claim 1, wherein the retaining means is adapted to remain in contact with the article as it retains the article to the holding means.

29. The apparatus as claimed in claim 2, wherein the retaining means is adapted to remain in contact with the article as it retains the article to the holding means.

* * * * *